United States Patent [19]

Ryzhkov et al.

[11] 4,016,777
[45] Apr. 12, 1977

[54] SHIP REDUCTION GEAR FOR CONTRAROTATING SCREWS

[76] Inventors: Nikolai Stepanovich Ryzhkov, ulitsa L. Golikova, 4, kv. 152; Viktor Petrovich Nikolaev, prospekt Stachek, 216, kv. 8; Viktor Alexeevich Krylov, ulitsa Khrustitskogo, 110, kv. 31; Leonid Yakovlevich Ioffe, ulitsa Gogolya, 21, kv. 26; Veniamin Vasilievich Krotov, ulitsa Stoikosti, 41, korpus 1, kv. 175; Jury Adolfovich Derzhavets, ulitsa Orbeli, 25, korpus 4, kv. 27, all of Leningrad, U.S.S.R.

[22] Filed: Jan. 9, 1975

[21] Appl. No.: 539,841

[52] U.S. Cl. .............................. 74/665 K; 74/665 L
[51] Int. Cl.² ........................................ F16H 37/06
[58] Field of Search ............... 74/687, 665 B, 710, 74/665 R, 665 M, 665 Q, 665 N, 710, 665 K, 665 L

[56] References Cited

UNITED STATES PATENTS

| | | | |
|---|---|---|---|
| 2,305,454 | 12/1942 | Nallinger et al. | 74/665 B |
| 3,094,967 | 6/1963 | Willis | 74/710 X |
| 3,881,444 | 5/1975 | Sigg | 74/665 L X |

*Primary Examiner*—Samuel Scott
*Assistant Examiner*—Frank H. McKenzie, Jr.
*Attorney, Agent, or Firm*—Haseltine, Lake & Waters

[57] ABSTRACT

A ship reduction gear having at least one differential, the driving element whereof is coupled with a driving means and each driven element is kinematically associated with the gear of a respective propeller shafting. The kinematic chain associating each driven element with a respective gear comprises pairs of gears permanently meshed with said gear and fitted on ends of their respective shafts whose other ends have fitted thereon gears permanently meshed with a pinion linked with a driven element of the differential, as a result of which the power taken from the driving means is divided into four flows, two flows per gear.

2 Claims, 1 Drawing Figure

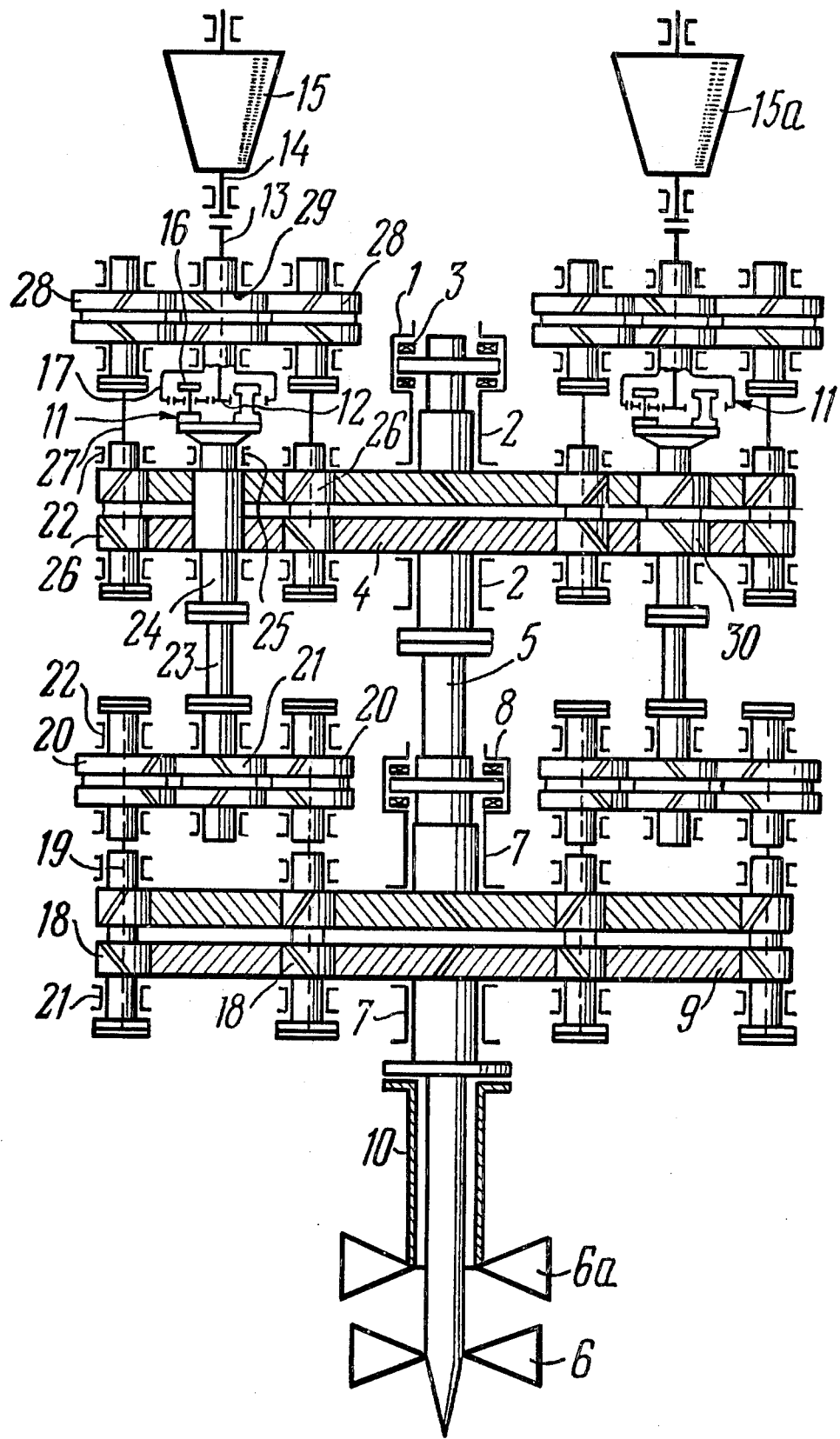

SHIP REDUCTION GEAR FOR CONTRAROTATING SCREWS

The present invention relates to the art of shipbuilding, and more particularly to ship reduction gears for contra-rotating screws.

The ship reduction gear of the present invention can most advantageously be used at large transport ships equipped with steam-turbine plates having a power of 30,000 hp and above.

Known in the art are reduction gears for contra-rotating screws, comprising two gears arranged in parallel and two differentials. These gears are fitted to coaxial propeller shafting. One of the gears is fitted to the external propeller shafting, while the other gear is fitted to the internal propeller shafting. Each differential has its driving element (sun gear) coupled with the output shaft of a driving means, in this case the turbine. The driven elements of the differential (pinion carrier and epicycle) are kinematically associated with respective gears. The kinematic coupling of each driven element is effected through a pinion provided thereon, permanently meshed with a respective gear.

In these prior art ship reduction gears, the power taken from a turbine is divided into two flows which are transmitted to respective gears, whereby the size and weight of the reduction gears are unduly great. For example, with the turbine power equalling 30,000 hp and over, the diameter of each gear may be as great as 5 m and sometimes even greater than that.

It is therefore an object of the present invention to obviate the above disadvantages.

The invention is aimed at providing a ship reduction gear for contra-rotating screws with a kinematic coupling between each driven element of the differential and a respective gear of the propeller shafting to permit cutting down the weight and size of the reduction gear without affecting the power thereof or increasing the power without any increase in its size.

With this and other objects in view, in a ship reduction gear for contra-rotating screws, comprising two gears arranged in parallel and fitted on an internal and an external shaftings, respectively, arranged coaxially and carrying the screws, as well as at least one differential, the driving element whereof is coupled with the output shaft of a driving means and each driven element is kinematically associated with the gear of a respective propeller shafting, the kinematic chain, associating each driven element of the differential with a respective propeller shafting gear, whereof includes, according to the invention, pairs of gears permanently meshed with the gear and fitted on ends of their respective shafts whose other ends have fitted thereon gears which are permanently meshed with a pinion linked with a driven element of the differential with the result that the power taken from the driving means is divided into four flows, two flows per propeller shafting gear.

It is suggested that the kinematic chain, associating a respective driven element of the differential with the gear fitted to the external propeller shafting coupling this driven element with the pinion includes an additional pinion permanently meshed with the gear fitted to the internal propeller shafting to synchronize the rotation speeds of the screws.

The ship reduction gear for contra-rotating screws, in accordance with the present invention, permits the weight and size thereof to be substantially cut down, as compared with the prior art ship reduction gears, without affecting its power or increasing the power transmitted to the screws approximately two-fold without any increase in its size.

The invention will now be described in greater detail with reference to a preferred, exemplary embodiment thereof, taken in conjunction with the accompanying drawing which shows sole FIGURE of the gearing arrangement of a ship reduction gear for contra-rotating screws, according to the invention.

Referring now to the drawing, the reduction gear comprises a housing 1 which accommodates, on journal bearings 2 and a thrust bearing 3, a gear 4 rigidly fixed to an internal propeller shafting 5 (the term "shafting" or "shaft" is herein used to denote a screw carrying shaft). The internal shafting 5 has a screw 6 fitted on its end.

The housing 1 also accommodates, on journal bearings 7 and a thrust bearing 8, another gear 9 which is parallel to the gear 4 and rigidly fixed to an external propeller shafting 10 coaxially arranged with respect to the internal propeller shafting 5. The external shafting 10 has a screw 6a fitted on its end. Two differentials 11 are also accommodated in the housing 1.

Each differential 11 has a driving element 12, which will be further termed in the description that follows as a "sun gear", coupled through an input shaft 13 with an output shaft 1 of a driving means 15 or 15a, which in this case is one of the turbines of the ship's propulsion plant.

Driven elements 16 and 17 of each differential 11 are kinematically associated with respective gears 4 and 9. The differentials 11 and their kinematic chains associating them with the gears 4 and 9 are similar, therefore, in what follows, whatever is said about one of the differentials or kinematic chains is equally applicable to the other.

The kinematic chain coupling the driven element 16, to be further termed as a "pinion carrier", with the gear 9 includes two pairs of gears 18 permanently meshed with the gear 9 of the propeller shafting 10, each gear 18 being fitted on an end of its torsion shaft 19 whose other end has fitted thereon a gear 20. The gears 20 are permanently meshed with a pinion 21. All the above gears and pinions of the kinematic chain are accommodated in the housing 1 and mounted on bearings 22.

The pinion 21 is coupled, through an intermediate shaft 23 and a shaft 24, with the pinion carrier 16. The shaft 24 is mounted on bearings 25 in the housing 25.

The kinematic chain coupling the driven element 17, to be further termed as an "epicycle", with the gear 4 included two pairs of gears 26 permanently meshed with the gear 4 of the propeller shafting 5. Each gear 26 is fitted on an end of its torsion shaft 27 with a gear 28 being fitted on its other end. The gears 28 are permanently meshed with a pinion 29. The pinion 29 is coupled with the epicycle 17. All the gears and pinions of this kinematic chain are also accommodated in the housing 1 and mounted on bearings 22.

In the kinematic chain coupling the pinion carrier 16 of the other differential 11, with the gear 9 fitted to the external propeller shafting 10, there is provided an additional pinion 30 fitted on the shaft 24 linking the pinion carrier 16 with the pinion 21. This pinion is permanently meshed with the gear 4 of the propeller shafting 5. The additional pinion 30 permits maintaining strict ratios between the rotation speeds of all the reduction gear elements, hence of the screws 6 and 6a.

The ship reduction gear for contra-rotating screws operates as follows. A flow of power from the turbine 15 is transmitted through the input shaft 13 to the sun gear 12 of the differential 11, whereat it is divided into two flows. The first flow of power is directed through the epicycle 17 to the pinion 29 whereat it is split again and the resulting two flows of power are transmitted through gears 28, torsion shafts 27 and gears 26 to the gear 4 which is thus imparted rotation in a sense opposite to that of the rotation of the input shaft 13. The second flow of power is transmitted through the pinion carrier 16 of the differential 11, rigidly secured to the shaft 24, to the pinion 21 whereat it is split and the resulting two flows are directed through gears 20, torsion shafts 19 and gears 18 to the gear 9 rotating in the same sense as the input shaft 13. Thus, the full power from a turbine 15 is transmitted through the output elements of the reduction gear, namely the gears 4 and 9, in four flows, or, in the case of two turbines 15 and 15a, in eight flows.

Such an arrangement permits either doubling the power being transmitted with the size of the gears 4 and 9 being the same or, without affecting the power, reducing the diameters of the gears 4 and 9, thereby cutting down the size and weight of the whole reduction gear.

Since the gears 4 and 9 are coupled independently, through the internal propeller shafting 5 and external propeller shafting 10, respectively, with the screws 6 and 6a, the ratios between the rotation speeds of the elements of the kinematic chains corresponding to respective paths of the flows of power depend on the torque characteristics of the screws.

Should it become necessary to maintain a strict ratio between the rotation speeds of all the elements of the reduction gear, propeller shaftings 5, 10 and screws 6, 6a, the reduction gear may be made mechanically closed. To this end, fitted on at least one shaft 24 should be the additional pinion 30 permanently meshed with the gear 4, whereby the reduction gear acquires a fixed gear ratio and the screws 6 and 6a are made to rotate with preset speeds. When the screws consume equal power, the pinion 30 is disengaged from the gear 4 and the flow of power is no more transmitted therethrough, the path of the flow towards the screws 6 and 6a being as described above.

Should the screw 6a consume more power than the screw 6, the flow of power is transmitted from the gear 4 to the additional pinion 30. And vice versa, when the screw 6 consumes more power, it is the pinion 30 that becomes driving and a certain amount of the flow of power is transmitted therefrom to the gear 4.

Fitting the additional pinion on at least one shaft 24 provides for uninterrupted propulsion of the ship even if one of the screws becomes inoperative. Should this be the case, the flows of power are redistributed as follows.

In the case of failure of the screw 6, the flows of power from both turbines 15 and 15a are transmitted through pinion carriers 16, pinions 21, gears 20 and gears 18 to the gear 9 whereat they are added up and directed further to the screw 6a. The flows of power from both turbines 15 and 15a are also transmitted through epicycles 17 (co-operating, under normal conditions, with the screw 6), pinions 29, gears 28 and gears 26 to the gear 4 whereat they are added up to be transmitted further to the additional pinion 30 from which the total flow is transmitted through pinion 21, gears 20 and gears 18 of the path from the turbine 15a to the gear 9, hence to the screw 6a.

In the case of failure of the screw 6a, the flows of power from both turbines 15 and 15a are transmitted through epicycles 17, pinions 29, gears 28 and gears 26 to the gear 4 whereat they are added up and directed further to the screw 6. The flow of power from the turbine 15a is transmitted through the pinion carrier 16 and additional pinion 30 directly to the gear 4 and on to the screw 6. The flow of power from the turbine 15 is transmitted through pinion carrier 16, shaft 24, intermediate shaft 23, pinion 21, gears 20 and gears 18 to the gear 9 wherefrom it is transferred from the opposite side to the path from the turbine 15a and, in the reverse order, through gears 18, gears 20, pinion 21 and intermediate shaft 23 to the additional pinion 30 and on, through the gear 4, to the screw 6.

Thus, the above synchronization of contra-rotating screws ensures reliable synchronization of power both under normal and emergency conditions without complicating the gearing arrangement of the reduction gear.

What is claimed is:

1. A ship reduction gear for two contra-rotating propeller screws (6, 6a), comprising: a housing (1); two gears (4, 9) arranged in said housing; an internal propeller shaft (5) rigidly connected with one (4) of said gears; an external propeller shaft (10) coaxial with said internal shaft and rigidly connected with the other (9) of said gears; said shafts carrying the screws and serving as the output elements of the ship reduction gear; at least one differential (11) installed in said housing and including a driving element (12) which is the input element of the ship reduction gear, and two driven elements (16, 17); kinematic chains (29 to 26 and 21 to 18), respectively connecting said driven elements with said gears (4, 9), each of said kinematic chains including first two pairs of gears (18, 26) permanently meshing with respective ones of said gears (4, 9) of the shafts, second two pairs of gears (20, 28), two shafts (19, 27), said first pairs of gears being fitted on one of their ends, and said second pairs of gears being fitted on their other ends, and pinions (21, 29) connected with respective ones of said driven elements (16, 17) and permanently meshing with said second pairs of gears; whereby the power flow transmitted to the reduction gear is divided into four flows, two flows per each of said gears (4, 9) of the shafts (5, 10).

2. The ship reduction gear as defined in claim 1, wherein said kinematic chain (18 to 21) that is associated with said gear (9) of the external shaft (10) carries an additional pinion (30) fitted on a shaft (24) that connects the respective driven element (16) with said pinion (21) and permanently meashing with said gear (4) of the internal shaft (5) to synchronize the rotational speeds of said screws (6, 6a).

* * * * *